United States Patent [19]
Okada

[11] Patent Number: 5,838,523
[45] Date of Patent: Nov. 17, 1998

[54] MAGNETIC HEAD WITH REDUCED GAP WEAR

[75] Inventor: Seijiro Okada, Neyagawa, Japan

[73] Assignee: Matsushita Electric Industrial Co., Ltd., Osaka, Japan

[21] Appl. No.: 944,653

[22] Filed: Sep. 14, 1992

[30] Foreign Application Priority Data

Sep. 30, 1991 [JP] Japan .................................. 3-250942

[51] Int. Cl.⁶ .................................................. G11B 5/187
[52] U.S. Cl. ...................................... 360/122; 360/130.3
[58] Field of Search ................................. 360/122, 119, 360/130.3; 1/130.3

[56] References Cited

U.S. PATENT DOCUMENTS

| | | | |
|---|---|---|---|
| 4,387,410 | 6/1983 | Takanohashi et al. | 360/119 |
| 4,849,841 | 7/1989 | Sokolik | 360/122 |
| 4,875,129 | 10/1989 | Favrou et al. | 360/122 |
| 4,888,657 | 12/1989 | Lacey et al. | 360/122 |
| 4,956,737 | 9/1990 | Brock | 360/122 |
| 5,034,838 | 7/1991 | Brock et al. | 360/122 |
| 5,498,403 | 3/1996 | Shin | 423/592 |
| 5,569,444 | 10/1996 | Blanchard et al. | 423/594 |

FOREIGN PATENT DOCUMENTS

| | | |
|---|---|---|
| 0462889 | 12/1991 | European Pat. Off. . |
| 0511755 | 11/1992 | European Pat. Off. . |
| 55-132547 | 10/1980 | Japan .................. 360/130.3 |
| 57-176521 | 10/1982 | Japan . |
| 58-130422 | 8/1983 | Japan . |
| 61-85607 | 5/1986 | Japan . |
| 62-119707 | 6/1987 | Japan . |
| 8906425 | 7/1989 | WIPO . |

OTHER PUBLICATIONS

Database Epodoc —E.P.O. CN1107442, Aug. 30, 1995, Wang Weibo: XP002064779; * abstract *.

Primary Examiner—Stuart S. Levy
Assistant Examiner—David L. Ometz
Attorney, Agent, or Firm—Stevens, Davis, Miller & Mosher, L.L.P.

[57] ABSTRACT

A magnetic head for use in an acoustic apparatus having first and second magnetic gaps provided between, and excluding, the head peak on the slidable surface of the magnetic tape and a tape departure point downstream of the running magnetic tape.

4 Claims, 3 Drawing Sheets

MAGNETIC HEAD WITH REDUCED GAP WEAR

BACKGROUND OF THE INVENTION

1. Field of the Invention

The present invention relates to a magnetic head of a magnetic recording/reproduction apparatus for use in acoustic apparatuses and equivalents thereof and, more particularly, to a magnetic head having great durability against wear thereof and being capable of maintaining excellent acoustic characteristics.

2. Description of the Related Art

In recent years, acoustic characteristics of music and equivalents thereof based on magnetic recording/reproducing methods have been improved remarkably. In conventional recording/reproduction using analog signals in cassette tapes, very-high-quality sound has been produced as characteristics of magnetic heads and magnetic tape have been improved and as signal processing technology and equivalents thereof have been developed.

In contrast, acoustic apparatuses utilizing recording/reproduction based on digital signals have come to be widely used in a short time, and their acoustic quality is very highly rated. Such apparatuses include compact disks (CDs) which use optical recording mediums or digital audio tape recorders (DATs) which record/reproduce digital signals onto/from a magnetic tape.

In the prior art described above, to record/reproduce analog or digital signals onto/from a magnetic tape, the magnetic tape must be run in close contact with the surface of a magnetic head; to minimize the amount of spacing loss, tension is applied to the running magnetic tape so that pressure is applied to the magnetic gap portion of the magnetic head.

FIG. 3 is a plan view illustrating a conventional thin-film type magnetic head. As shown in FIG. 3, magnetic gaps 1 and 2 are formed in the section where a magnetic board 3 is bonded to a protective board 4. A composite type magnetic head is formed by two magnetic heads constructed as described above. Signals are generally recorded/reproduced onto/from tracks whose widths are one half of those of magnetic tape 5 by a first magnetic gap 1 while the magnetic tape 5 is slidably contacting the slidable surface of the magnetic head constructed as described above and running to the right as indicated by an arrow A. When the magnetic tape 5 is run to the left as indicated by an arrow B, signals are generally recorded/reproduced onto/from the other half of the tracks of the magnetic tape 5 by a second magnetic gap 2. While the magnetic recording/reproduction apparatus is operating, the magnetic tape 5 is lightly pressed against the slidable surface of the magnetic head by a pad 6. At this time, the positions of the peaks of the head match the positions of the first and second magnetic gaps 1 and 2. Points at which the alternate long and two short dashed lines 7A and 8A intersect the slidable surface of the magnetic heads, i.e., points 7 and 8, are tape departure points when the magnetic tape 5 runs to the right or left, respectively.

However, in the conventional magnetic head described above, when the magnetic tape 5 runs in contact with the slidable surface of the magnetic head, the magnetic gaps 1 and 2 wear due to tension applied to the magnetic tape 5. Thus, there is a problem in that the magnetic tape 5 has poor durability over a long period of time, because the head peak of the magnetic head is in the same position as the magnetic gaps 1 and 2.

FIG. 4 shows the distribution of pressure applied to the slidable surfaces of the magnetic gaps 1 and 2 when the magnetic tape 5 is run with respect to the conventional magnetic head described above. It can be seen from this figure that the greatest pressure is applied to the portions of the magnetic gaps 1 and 2.

SUMMARY OF THE INVENTION

It is an object of the present invention to provide an excellent magnetic head, by which the above-mentioned problems of the prior art are solved, in which the durability of magnetic gaps is optimized even when the magnetic head is used for a long period of time.

In the present invention which achieves the above-described objectives, a first magnetic gap and a second magnetic gap are each provided between and excluding the head peak on the slidable surface of the magnetic tape and the tape departure point downstream of the running magnetic tape.

Therefore, according to the present invention, since magnetic gaps are provided between the head peak of the magnetic head and tape departure points, the magnetic gaps can be protected from the pressure of back tension and equivalents thereof generated from a mechanism for driving a magnetic tape in contact with the slidable surface of the magnetic head when the magnetic tape runs. Thus, the magnetic gaps are not worn out and acoustic characteristics and equivalents thereof do not deteriorate even if the magnetic head is used for a long period of time.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENT

Figure 1:
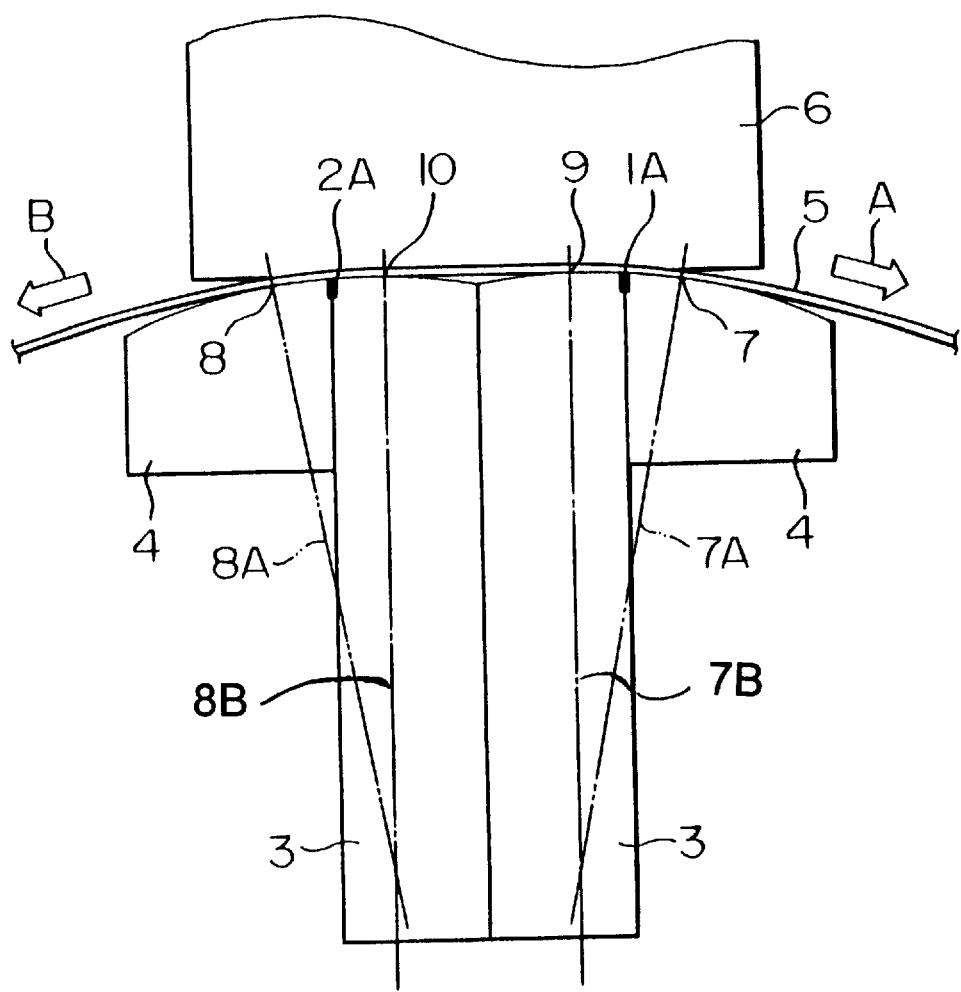
FIG. 1 is a schematic plan view of a magnetic head according to an embodiment of the present invention.
Figure 2:
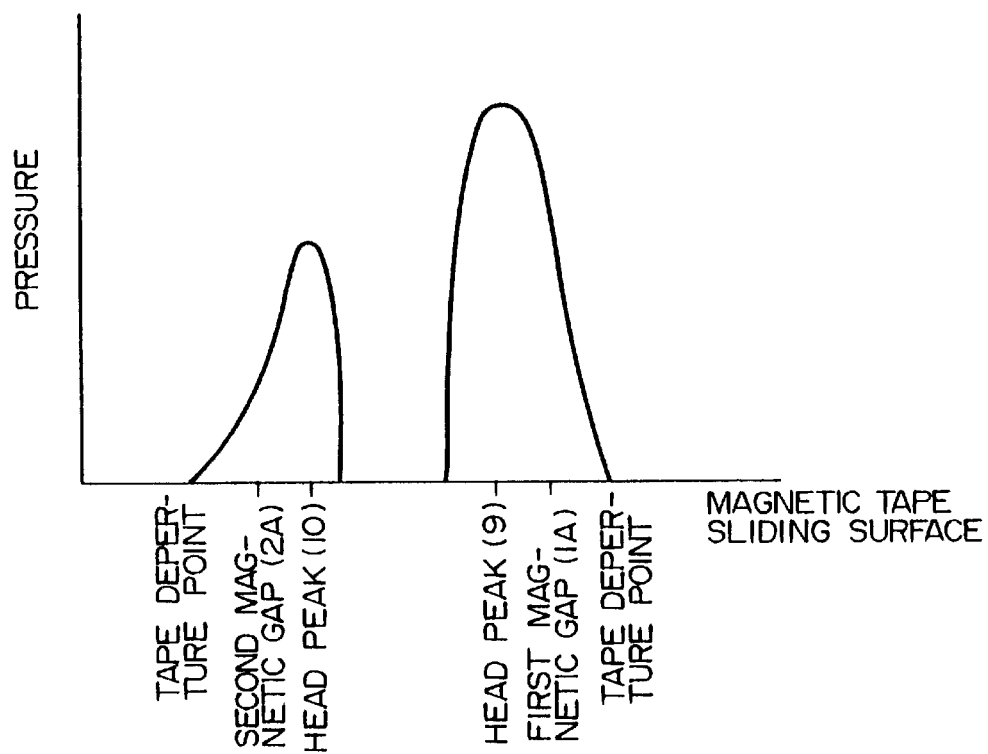
FIG. 2 shows the distribution of pressure applied to the slidable surface of the magnetic head by back tension.
Figure 4:
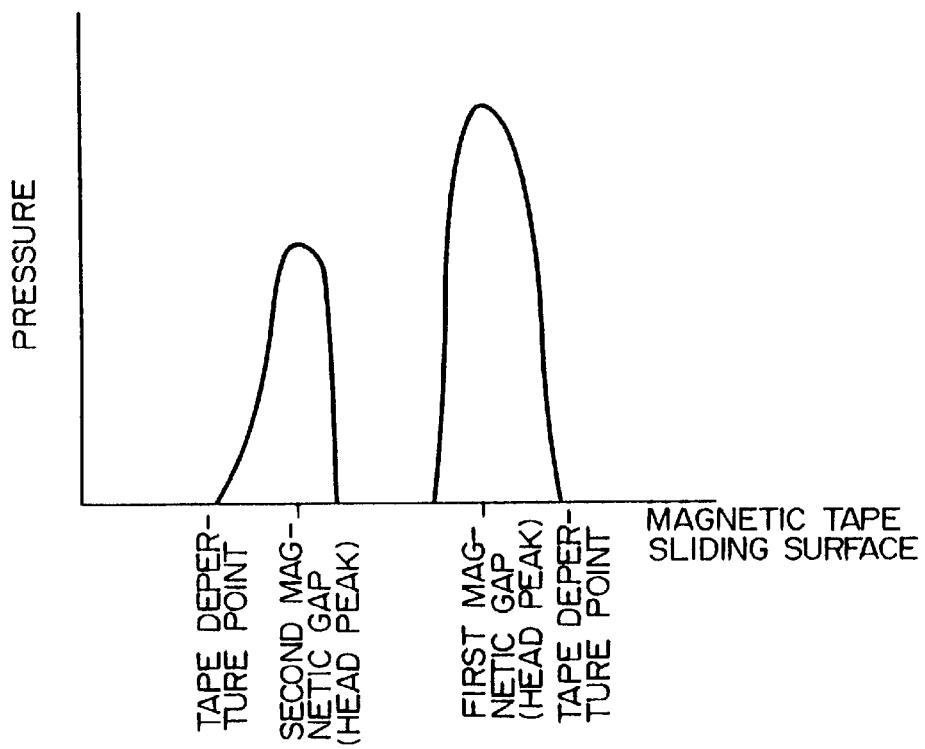
FIG. 4 shows the distribution of pressure applied to the slidable surface of the above magnetic head by back tension.
Figure 3:
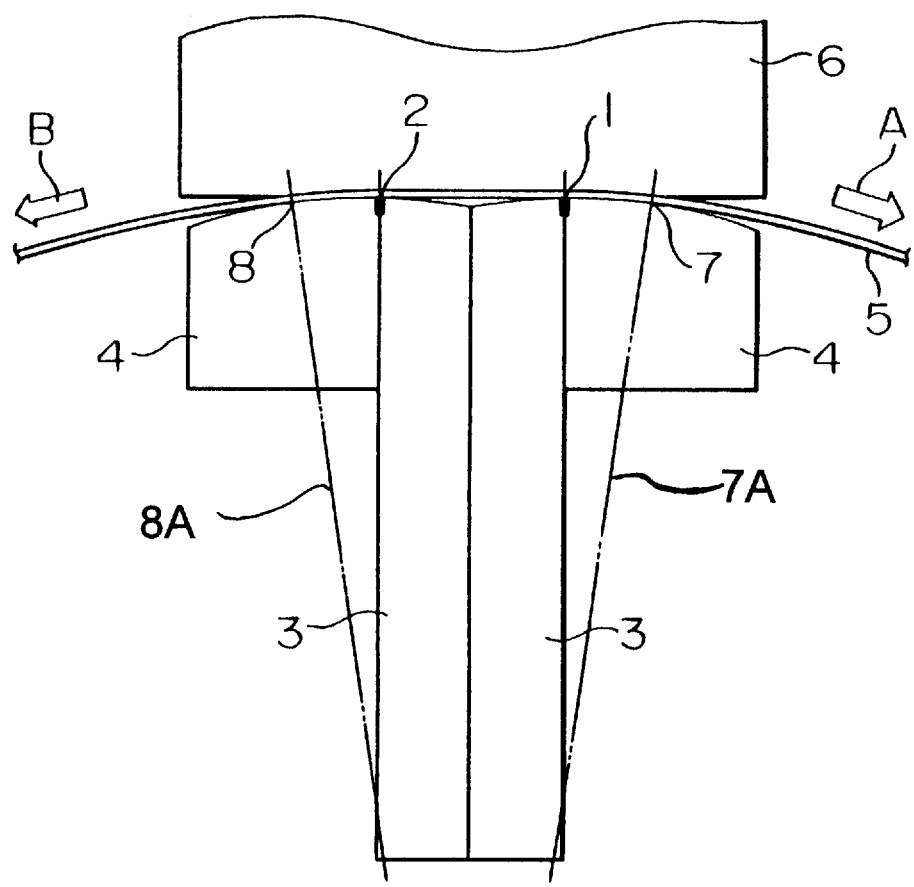
FIG. 3 is a schematic plan view of a conventional magnetic head.

A preferred embodiment of the present invention will be explained below with reference to the accompanying drawings. Parts in FIGS. 3 and 4 which are the same as those in FIGS. 1 and 2 are given the same reference numerals. A detailed explanation will be given only about points which differ.

In FIG. 1, points at which the long and short dashed lines 7B and 8B intersect the slidable surface of the magnetic head, i.e., points 9 and 10, are head peaks, respectively. Maximum pressure is realized at this head peak by pressure applied by back tension generated from a driving mechanism (not shown) which supplies or takes up the magnetic tape 5 when it runs to the right as indicated by the arrow A or to the left as indicated by the arrow B, respectively.

In the magnetic head of this embodiment, as shown in FIG. 1, when the magnetic tape 5 runs toward the right, a first magnetic gap 1A is provided between, and excluding, the head peak 9 on the slidable surface on which the magnetic tape 5 contacts and the tape departure point 7. When the magnetic tape 5 runs to the left, a second magnetic gap 2A is similarly provided between, and excluding, a head peak 10 and the tape departure point 8. Therefore, as shown in FIG. 2, the pressure applied to the slidable surface resulting from back tension generated from a driving mechanism is maximized at the head peak 9 or 10, and is reduced greatly in the first magnetic gap 1A or the second magnetic gap 2A.

When the magnetic tape 5 is running to the right, it contacts the slidable surface of the magnetic head in the section between the head peak 9 and the tape departure point 7; when the magnetic tape 5 is running to the left, it contacts the slidable surface of the magnetic head in the section between the head peak 10 and the tape departure point 8. Since the magnetic tape 5 is lightly pressed against the slidable surface by the pad 6, spacing loss hardly occurs.

Although a composite type magnetic head having two magnetic gaps 1A and 2A has been explained in the above-described embodiment, in which the magnetic tape 5 runs both to the right and left for recording/reproduction, the same effect can be obtained if a magnetic gap is positioned in the same manner as above in a magnetic head having one magnetic gap, in which the magnetic tape 5 runs in one direction for recording/reproduction.

According to the above-described embodiment, the wear of the magnetic gaps 1 and 2 can be reduced since the magnetic gap 1 is provided between, and excluding, the head peak 9 and the tape departure point 7, and the second magnetic gap 2 is provided between and excluding the head peak 10 and the tape departure point 8.

As is clear from the above-described embodiment of the present invention, a first and second magnetic gap are each provided between, and excluding, the head peak on the slidable surface of the magnetic tape and the tape departure point downstream of the running magnetic tape. As a result, the wear of the magnetic gap caused by the magnetic tape can be reduced greatly, thereby increasing durability against wear and maintaining excellent acoustic characteristics for a long period of time.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the claims. The following claims are to be accorded a broad interpretation, so as to encompass all possible modifications and equivalent structures and functions.

What is claimed is:

1. A magnetic head device for recording and reproducing signals to and from a magnetic tape, said magnetic head assembly comprising:

a magnetic head having a slidable surface for contacting with the magnetic tape and a magnetic gap disposed within said slidable surface; and means, disposed adjacent to said slidable surface, for pressing the magnetic tape against a predetermined portion of said slidable surface, said magnetic gap being disposed within said predetermined portion of said slidable surface, and being provided between, but not on, (i) a head peak of said slidable surface and (ii) a tape departure point where the magnetic tape disengages from contact with said slidable surface in a first direction.

2. A magnetic head device according to claim 1, wherein said means for pressing comprises a pad.

3. A magnetic head device according to claim 1, wherein said magnetic head further comprises a second magnetic gap disposed within said predetermined portion of said slidable surface, said second magnetic gap being provided between, but not on, (i) said head peak of said slidable surface and (ii) a second tape departure point where the magnetic tape disengages from contact with said slidable surface in a second direction.

4. A magnetic head device according to claim 3, wherein said means for pressing comprises a pad.

* * * * *